E. H. WOELFFEL.
HOSE COUPLING.
APPLICATION FILED SEPT. 28, 1914.
1,137,686.
Patented Apr. 27, 1915.
2 SHEETS—SHEET 1.
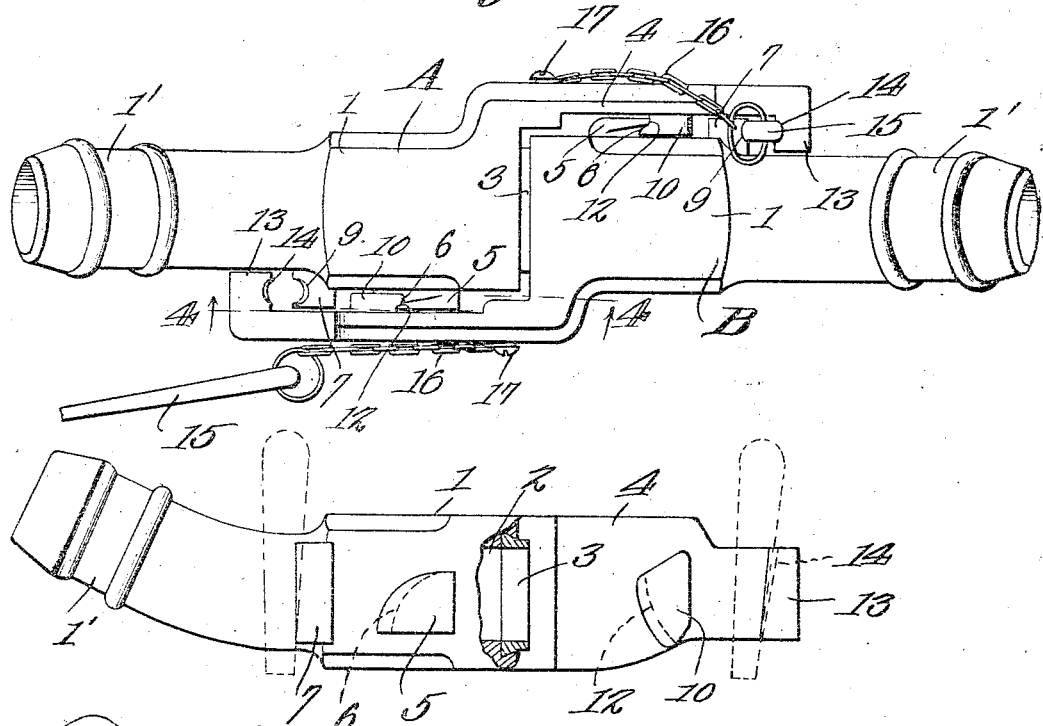
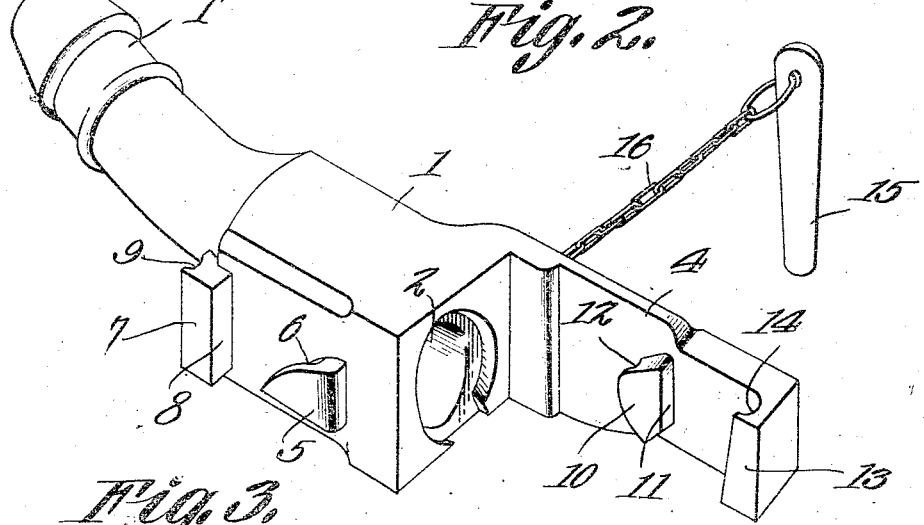
Witnesses
E. H. Woelffel, Inventor,
by Attorneys

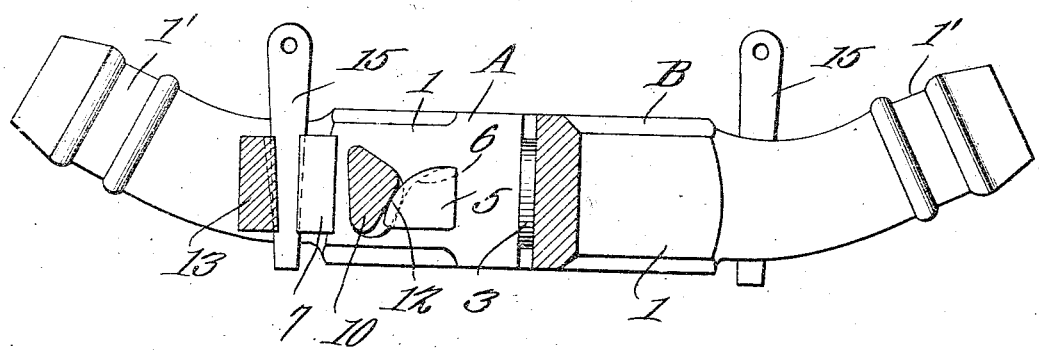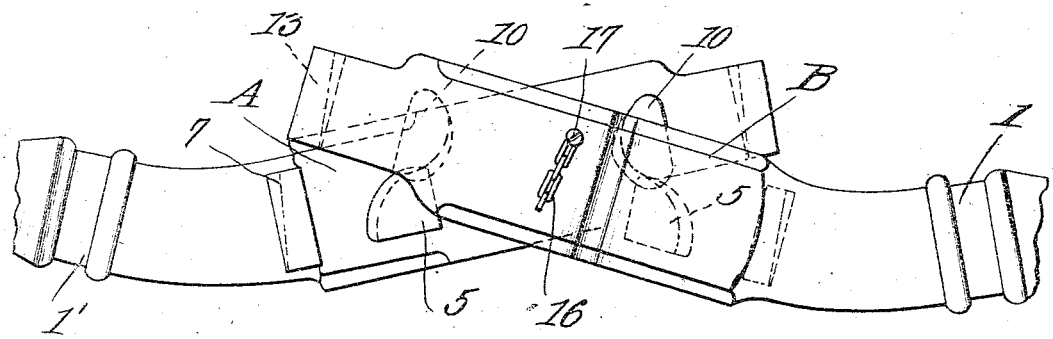

UNITED STATES PATENT OFFICE.

ERNEST HENRY WOELFFEL, OF POINT PLEASANT, WEST VIRGINIA.

HOSE-COUPLING.

1,137,686.

Specification of Letters Patent.

Patented Apr. 27, 1915.

Application filed September 23, 1914. Serial No. 863,950.

*To all whom it may concern:*

Be it known that I, ERNEST H. WOELFFEL, a citizen of the United States, residing at Point Pleasant, in the county of Mason and State of West Virginia, have invented a new and useful Hose-Coupler, of which the following is a specification.

The present invention relates to improvements in hose couplers, and relates more particularly to hose couplings for train pipes, either for carrying steam or air, one object of the invention, being the provision of a coupler of the Sewall type, in which a positive lock is provided, such lock under the normal jarring of the parts due to the movement of the train being automatically increased in effectiveness to hold the mating members in locked relation with the ports alined.

Various locking means have been provided for mating members of hose couplers, some having bolts manually operated to engage the respective arms of mating connections so as to depress the same and cause the coöperating lug to draw the mating members more closely together, while others have been provided with locking bolts having variously designed means for bringing such bolts into play to produce the desired locking effect. All of these locks have the objection that it requires too much time to manipulate the same in assembling and disconnecting the mating couplings. The present lock has therefore been designed to permit of the rapid manipulation thereof both in locking the mating connectors and in releasing such connectors.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of two mating connectors assembled, the locking pin of one being removed. Fig. 2 is a side elevation of one of the connectors with the port portion in section, dotted lines illustrating the position of the two locking pins. Fig. 3 is a perspective view of a complete coupler. Fig. 4 is a section taken on line 4—4 of Fig. 1, the pins being in locking position. Fig. 5 is a side elevation of two mating connectors in the position they assume when being disconnected or connected. Fig. 6 is a cross section through one of the locking pins.

Referring to the drawings, A and B designate the two mating couplers, each one of which is identical in construction, therefore the description of one will suffice for both.

The body portion 1 of the coupler is provided with the hose connecting member 1', the member 1 and hose connector 1' being provided with a channel 2 therethrough for the passage of fluid. A port ring 3 is mounted in the outer end of the channel 2, as clearly illustrated in Fig. 2. An arm 4 is formed integral with the body 1 and extend longitudinally thereof at one side thereof while formed integral with the body 1 at the opposite side thereof is the lug 5 provided with the cam groove 6, and the straight lug 7 having the inner straight face 8 which is at right angles to the face of the body 1 at such point, and with the oppositely disposed grooved face 9.

The arm 4, as clearly illustrated in Fig. 3 is provided with the lug 10 having the straight face 11 and with the cam groove face 12 at the opposite side, said lug 10 being disposed to coöperate with the lug 5, as clearly illustrated in Figs. 1, 4 and 5, while formed integral with the inner face of the extreme end of the arm 4 is a projection 13, provided with the grooved face 14 which is adapted to oppose the groove 9 of the lug 7 so that both groove faces 9 and 14 will present a tapered bore receptacle for the tapered locking pin 15.

Each member carries its pin, through the medium of the chain 16 and the connection 17 so that the tapered pin 15 may be inserted from above between the respective lugs 7 and 13 and thus readily fall into position. It will thus be seen that the gravity effect upon the same due to the shaking of mating couplers will cause the wedging pins 15 to be placed in greater wedging relation to the lugs 7 and 13, and thus more securely lock the ports 3 into registration.

As the pins 15 are of greater length than the respective lugs between which they fit, the same may be readily removed, by the trainman striking the lower ends of the pins to drive them upwardly. It will thus be seen that with this construction, that a simple locking means as the pins 15 are provided, to coöperate with the respective lugs 7 and 13 to thus assist the cam lugs 5 and 10 in holding the mating couplers connected. It will also be noted that by providing two of these pins, that the pressure is equalized upon each side of the couplers, so that there will be no torsional strain thrown upon the port rings 3 and such port rings 3 will be held with equal strain upon both sides so as to insure the proper alinement and proper registration thereof.

What is claimed is:

1. A direct port coupler, having mating members, each member of which has a body portion and a longitudinally extended arm adapted to overlap with the body portion of the mating member, a guiding locking means between each arm and body to force the parts assembled, and a bodily removable gravity locked tapered pin carried by each member for wedging the members to clamp them in locked relation.

2. A direct port coupler, having mating members, each member of which has a body portion and a longitudinally extended arm adapted to overlap with the body portion of the mating member, a guiding locking means between each arm and body to hold the parts from transverse movement and a tapered pin insertible from above and between the arm of one member and the body portion of the other member for clamping the members in locked relation and held from longitudinal movement.

3. A direct port coupler, having mating members, each member of which has a body portion and a longitudinally extended arm adapted to overlap with the body portion of the mating member, locking means between each arm and body to hold the parts from transverse movement, and two tapered pins, one carried by each member for interposition from above between each arm and the body portion of the mating members, whereby the mating members are clamped at two points beyond the ports and the locking means and held from longitudinal movement.

4. A direct port coupler, having two mating members, each member of which has a body portion and a longitudinally extended arm adapted to overlap the body portion of the mating member, two locking cams, one carried by the body portion and the other carried by the arm of each member, the lug of one arm coöperating with the lug of the other body portion to move and hold the mating members from transverse separation, a lug having a groove upon the opposite face to the first lug of the body portion, a projection carried upon the inner end of the arm, the projection of one arm opposing the last mentioned lug of the mating member, and two tapered pins insertible between each pair of coacting projection and lug to lock the mating members in locked relation and from longitudinal movement.

5. A direct port coupler, having two mating members, each member of which has a body portion and a longitudinally extended arm adapted to overlap the body portion of the mating member, two locking cams, one carried by the body portion and the other carried by the arm of each member, the lug of one arm coöperating with the lug of the other body portion to move and hold the mating members coupled, a lug carried by the body portion and having a groove upon the opposite face to the first lug of the body portion, a projection carried upon the extreme inner end of the arm, the projection of one arm opposing the last mentioned lug of the mating member, and two bodily removable tapered pins insertible from above between each pair of coacting projection and lug to lock the mating members in locked relation and from longitudinal movement, such pins being held in wedging relation due to the gravity action thereof.

6. The combination in a direct port coupler, of two duplicate heads, a longitudinally extended arm carried by each head, coöperable means carried by the inner face of one arm and the adjacent portion of the body of the other head for guiding the heads and for holding them against transverse movement, two lugs carried respectively one upon the inner face at the extreme end of the arm and the other for coöperation in spaced relation with said lugs, the latter being carried upon the body of the mating head, the adjacent faces of the two lugs being tapered, and a tapered pin for each pair of said lugs insertible between the tapered walls thereof for wedging the heads together to hold the same against longitudinal movement.

7. The combination in a direct port coupler, of two duplicate heads, coöperating means for guiding and locking the heads together, and an insuring lock, comprising two pairs of lugs, one of each pair being carried by each head, and two removable tapered pins insertible one between each pair of lugs from above to be firmly impinged therebetween due to the shaking of the coupled heads under service conditions.

In testimony that I claim the foregoing as my own, I have hereto affixed my signature in the presence of two witnesses.

ERNEST HENRY WOELFFEL.

Witnesses:
C. R. McCULLOCH,
M. V. HAY.